United States Patent Office.

IMPROVED SOAP.

S. I. BEELER, OF WALES, ILLINOIS.

Letters Patent No. 60,328, dated December 11, 1866.

---

The Schedule referred to in these Letters Patent and making part of the same.

---

TO ALL WHOM IT MAY CONCERN:

Be it known that I, SAMUEL I. BEELER, of Wales, in the county of Ogle, and State of Illinois, have invented a new and useful improvement in the Manufacture of Soap; and I do hereby declare that the following is a clear, full, and exact description thereof, reference being had to the accompanying description.

To make my improved soap, I use the following ingredients in the proportions as follows, to wit: Of lime 1 lb., of sal soda 2 lbs.; of concentrated lye 1 lb.; of borax ½ lb.; of alum ¼ lb.; of salt petre 2 oz.; of animal grease 10 lbs.; of water 3 gals. I first dissolve the lime in one-half gallon of water and let it settle. Then put one gallon of water in a kettle, and heat, and add the concentrated lye, and then add the sal soda. As soon as these are thoroughly dissolved, I pour in the lime water, and let it cool and settle. I then melt the grease in a separate vessel, and add to it about one-half of the lye or liquid and commence to boil it, continuing to add the lye and water until nearly done, when I add the remaining ingredients, and water, and continue to boil until thoroughly incorporated. It may then be cooled and moulded, or treated in any desired manner.

Having thus described my invention, what I claim, is—

The use of the ingredients herein named, in the proportions and manner substantially as set forth, for the manufacture of soap.

S. I. BEELER.

Witnesses:
SAML. E. BINNY,
STEPHEN LEWIS.